United States Patent
Hiratani et al.

(10) Patent No.: US 12,427,905 B2
(45) Date of Patent: Sep. 30, 2025

(54) METHOD OF CONTROLLING STORAGE CONVEYOR AND STORAGE CONVEYOR SYSTEM

(71) Applicant: TOYOTA JIDOSHA KABUSHIKI KAISHA, Toyota (JP)

(72) Inventors: Toshihiko Hiratani, Toyota (JP); Naoyuki Taguri, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 365 days.

(21) Appl. No.: 18/140,171

(22) Filed: Apr. 27, 2023

(65) Prior Publication Data

US 2023/0347807 A1   Nov. 2, 2023

(30) Foreign Application Priority Data

May 2, 2022  (JP) .................................. 2022-076272

(51) Int. Cl.
| | | |
|---|---|---|
| *B60P 1/52* | (2006.01) | |
| *B60P 3/00* | (2006.01) | |
| *B65G 13/10* | (2006.01) | |
| *B65G 47/54* | (2006.01) | |

(52) U.S. Cl.
CPC ................. *B60P 1/52* (2013.01); *B60P 3/007* (2013.01); *B65G 47/54* (2013.01); *B65G 13/10* (2013.01)

(58) Field of Classification Search
CPC . B60P 1/52; B60P 3/007; B65G 13/10; B65G 47/54
USPC ........................................................ 414/529
See application file for complete search history.

(56) References Cited

U.S. PATENT DOCUMENTS

| | | | | |
|---|---|---|---|---|
| 2,534,057 | A * | 12/1950 | Pride .......................... | B60P 1/52 414/500 |
| 3,710,917 | A * | 1/1973 | Black ..................... | B65G 47/54 198/370.09 |
| 6,622,846 | B1 * | 9/2003 | Dean ......................... | B60P 1/52 198/370.09 |
| 9,630,545 | B1 * | 4/2017 | Corrigan ................... | B60P 1/52 |
| 12,134,532 | B2 * | 11/2024 | Haid .......................... | B60P 1/00 |
| 2022/0097970 | A1 | 3/2022 | Kiyokami | |

FOREIGN PATENT DOCUMENTS

| | | | | |
|---|---|---|---|---|
| EP | 0268323 A1 * | 5/1988 | ................ | B60P 1/52 |
| JP | S55-123814 A | 9/1980 | | |
| JP | H03-085223 A | 4/1991 | | |
| JP | H05-139536 A | 6/1993 | | |
| JP | H05-319559 A | 12/1993 | | |
| JP | H09183510 A * | 7/1997 | ............. | B65G 47/54 |
| JP | 2001-048341 A | 2/2001 | | |
| JP | 2020-090151 A | 6/2020 | | |
| WO | WO-9932326 A1 * | 7/1999 | ................ | B60P 1/52 |
| WO | WO-2022146447 A1 * | 7/2022 | ................ | B60P 1/52 |

* cited by examiner

*Primary Examiner* — James Keenan
(74) *Attorney, Agent, or Firm* — Dinsmore & Shohl LLP

(57) ABSTRACT

A storage conveyor mounted on a vehicle and configured to convey a cargo includes a right angle turn unit configured to change a traveling direction of the cargo from a first direction to a second direction orthogonal to the first direction at a right angle. When the traveling direction of the cargo is changed in the right angle turn unit, the cargo is pulled to a corner portion, which is a downstream end in the first direction and an upstream end in the second direction of the right angle turn unit, and then the cargo is conveyed to a downstream side in the second direction.

5 Claims, 13 Drawing Sheets

METHOD OF CONTROLLING STORAGE CONVEYOR AND STORAGE CONVEYOR SYSTEM

CROSS REFERENCE TO RELATED APPLICATION

This application claims priority to Japanese Patent Application No. 2022-076272 filed on May 2, 2022, which is incorporated herein by reference in its entirety including the specification, claims, drawings, and abstract.

TECHNICAL FIELD

The present specification discloses a method of controlling a storage conveyor mounted on a vehicle, and a storage conveyor system.

BACKGROUND

In the related art, mounting a storage conveyor inside a vehicle has been proposed. The storage conveyor stores a cargo and conveys the cargo to any position in the storage conveyor.

JP 2020-090151 A discloses a vehicle including a rack on which a cargo is placed, a conveyor provided below the rack and configured to move the cargo forward and rearward, a stacker crane configured to move the cargo on the rack upwards, downwards, forward, and rearward to move the cargo to the conveyor, and a robot arm configured to deliver the cargo on the conveyor to a traveling robot. According to the above-described technique, since the cargo on the rack is automatically taken out and delivered to the traveling robot, efficient delivery can be performed to some extent.

Here, some storage conveyors include a right angle turn unit that changes the traveling direction of the cargo by 90 degrees. When the storage conveyor is installed on the horizontal plane, the cargo can be smoothly conveyed by simple control. However, when the storage conveyor is mounted on the vehicle, the posture of the cargo stored in the storage conveyor may be inclined, depending on inclination of the road surface. When the posture of the cargo is inclined in the right angle turn unit, the cargo may interfere with a partition wall or the like of a conveyance path and may fail to advance smoothly.

Therefore, the present specification discloses a storage conveyor system and a method of controlling a storage conveyor capable of smoothly conveying a cargo regardless of the gradient of the road surface.

SUMMARY

A method of controlling a storage conveyor disclosed in the present specification is a method of controlling the storage conveyor mounted on a vehicle and configured to convey a cargo, in which the storage conveyor includes a right angle turn unit configured to change a traveling direction of the cargo from a first direction to a second direction orthogonal to the first direction at a right angle, and the method comprises pulling, when the traveling direction of the cargo is changed in the right angle turn unit, the cargo to a corner portion, which is a downstream end in the first direction and an upstream end in the second direction of the right angle turn unit, and then conveying the cargo to a downstream side in the second direction.

The posture of the cargo is corrected by pulling the cargo to the corner portion. Thereafter, the cargo is sent in the second direction, thereby making it possible to effectively prevent the cargo from being caught on a partition wall or the like of a conveyance path. As a result, according to the above configuration, the cargo can be smoothly conveyed regardless of the gradient of the road surface.

In this case, after the cargo is pulled to the corner portion, the cargo may be sent to the downstream side in the second direction while being sent to the downstream side in the first direction.

According to the above configuration, it is possible to prevent the posture of the cargo from being inclined in the process of sending the cargo to the downstream side in the second direction. As a result, the cargo can be conveyed more smoothly.

Further, the storage conveyor may further include a straight unit configured to convey the cargo without changing the traveling direction of the cargo, and the method may further including temporarily causing a second cargo located in the straight unit connected to an upstream side in the first direction from the right angle turn unit to travel in a reverse direction to the upstream side in the first direction after starting processing of pulling a first cargo to the corner portion and before starting processing of conveying the first cargo to the downstream side in the second direction, and then stopping conveyance of the second cargo until completion of the processing of conveying the first cargo to the downstream side in the second direction.

According to the above configuration, it is possible to appropriately separate the first cargo that changes its direction at a right angle from the second cargo located on the upstream side thereof. Thus, it is possible to prevent the second cargo from entering a right angle turn unit while the first cargo is sent to the downstream side in the second direction. In other words, it is possible to prevent the second cargo from being sent to the downstream side in the second direction together with the first cargo before being pulled to the corner portion.

A storage conveyor system disclosed in the present specification includes a storage conveyor mounted on a vehicle and configured to convey a cargo, and a controller configured to control driving of the storage conveyor, in which the storage conveyor includes a right angle turn unit configured to change a traveling direction of the cargo from a first direction to a second direction orthogonal to the first direction at a right angle, and the controller controls the driving of the storage conveyor so as to, in the right angle turn unit, pull the cargo to a corner portion, which is a downstream end in the first direction and an upstream end in the second direction of the right angle turn unit, and then convey the cargo to a downstream side in the second direction.

The posture of the cargo is corrected by pulling the cargo to the corner portion. Thereafter, the cargo is sent in the second direction, thereby making it possible to effectively prevent the cargo from being caught on a partition wall or the like of a conveyance path. As a result, according to the above configuration, the cargo can be smoothly conveyed regardless of the gradient of the road surface.

In this case, the right angle turn unit may include a plurality of first conveyance rollers configured to rotate around an axis parallel to the second direction and to send the cargo to a downstream side in the first direction by rotation thereof in a forward direction, and a plurality of second conveyance rollers configured to rotate around an axis parallel to the first direction and to send the cargo to the downstream side in the second direction by rotation thereof in the forward direction, and the controller may rotate the first conveyance roller in the forward direction and rotate the second conveyance roller in a reverse direction when pulling the cargo to the corner portion, and may rotate the first conveyance roller in the forward direction and rotate the second conveyance roller in the forward direction when conveying the cargo to the downstream side in the second direction.

According to the above configuration, it is possible to pull the cargo to the corner portion with simple control. Further, when sending the cargo to the downstream side in the second direction, the first conveyance roller also rotates in the forward direction, thereby making it possible to prevent the posture of the cargo from being inclined in the process of sending the cargo to the downstream side in the second direction.

The right angle turn unit may be divided into a first area in which the plurality of first conveyance rollers are disposed and a second area in which the plurality of second conveyance rollers are disposed with a diagonal line of the right angle turn unit passing through the corner portion as a boundary, and the right angle turn unit may further include a first assist roller disposed in the second area and configured to rotate in the forward direction so as to send the cargo to the downstream side in the first direction, the first assist roller having a diameter larger than a diameter of the second conveyance roller, and a second assist roller disposed in the first area and configured to rotate in the forward direction so as to send the cargo to the downstream side in the second direction, the second assist roller having a diameter larger than a diameter of the first conveyance roller.

By providing the second assist roller, even when most of the cargo is located in the first area, the cargo can be sent in the second direction, and by providing the first assist roller, even when most of the cargo is located in the second area, the cargo can be sent in the first direction. As a result, the traveling direction of the cargo can be more appropriately changed to a right angle. In addition, by making the first and second assist rollers larger in diameter than the second and first conveyance rollers, a transmission member (for example, a belt or the like) configured to transmit power to each roller is less likely to interfere, and the mechanical configuration of power transmission can be simplified.

The storage conveyor may further include a partition wall configured to stand along a conveyance route and to define a boundary of a conveyance path of the storage conveyor, and a sliding rail fixed to the partition wall and configured to abut on the cargo to prevent detachment of the cargo from the conveyance route, the sliding rail having a friction coefficient lower than a friction coefficient of the partition wall.

According to the above configuration, even if the cargo is pulled to the corner portion, it is possible to prevent the cargo from being rubbed against the partition wall and being worn.

In addition, the conveyance route may have a one-stroke shape of circularly conveying the cargo.

By circularly conveying the cargo, any cargo can be conveyed to any position on the conveyance route at any time.

In this case, the conveyance route having the one-stroke shape may have a forward route, and a return route traveling in a direction opposite the forward route, the forward route and the return route being turned back an odd number of times in a zigzag shape so as to be alternately arranged in a direction orthogonal to the forward route, and may travel in the direction orthogonal to the forward route so as to return to a departure point, and two of the right angle turn units may be disposed adjacent to each other in the orthogonal direction at a portion where the conveyance route is turned back.

According to the above configuration of the conveyance route, it is possible to circularly convey the cargo while suppressing generation of a dead space.

According to the technique disclosed in the present specification, it is possible to smoothly convey a cargo regardless of the gradient of the road surface.

DESCRIPTION OF EMBODIMENTS

Figure 1:
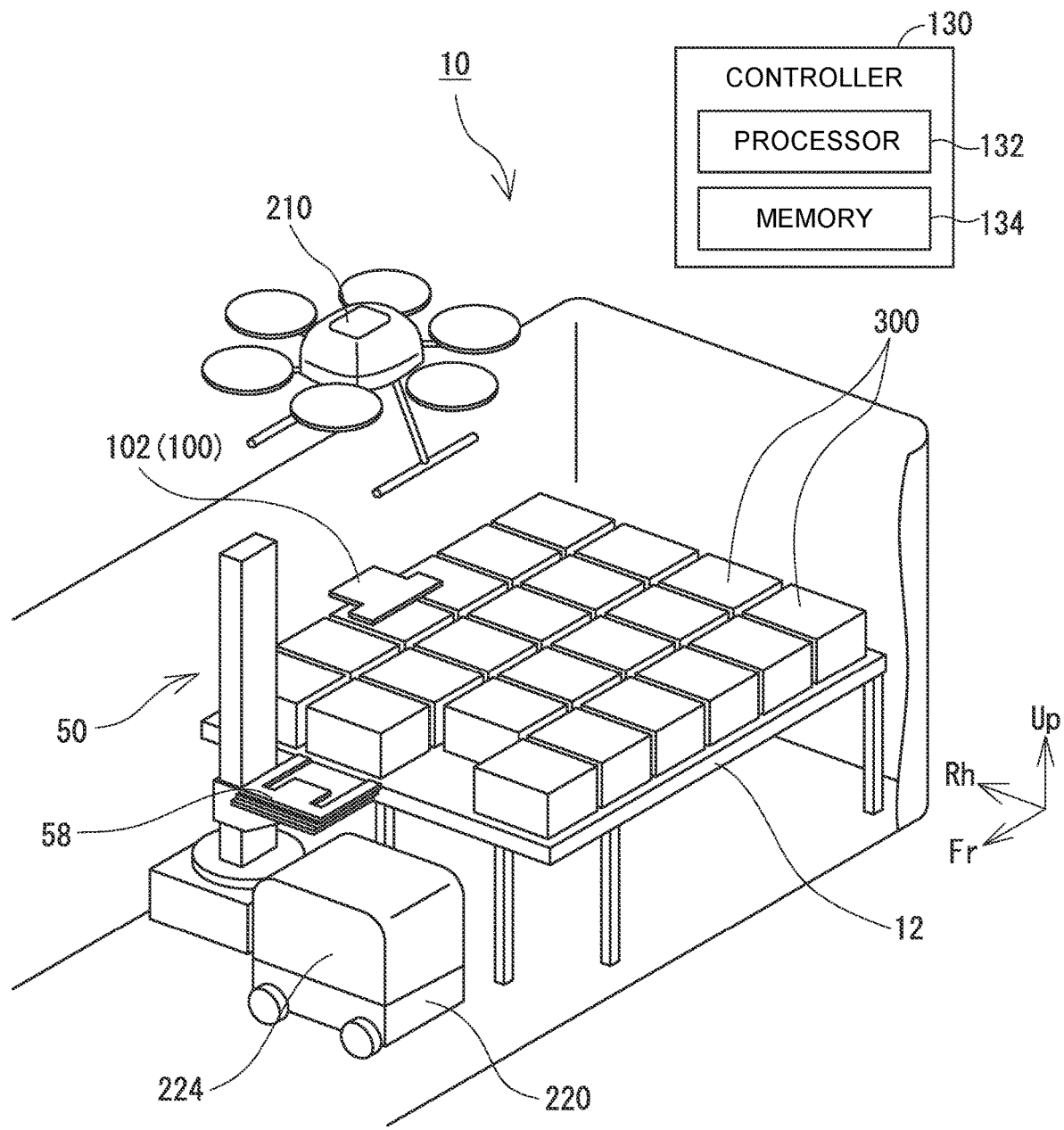
FIG. 1 is a schematic perspective view of a cargo handling system.
Figure 2:
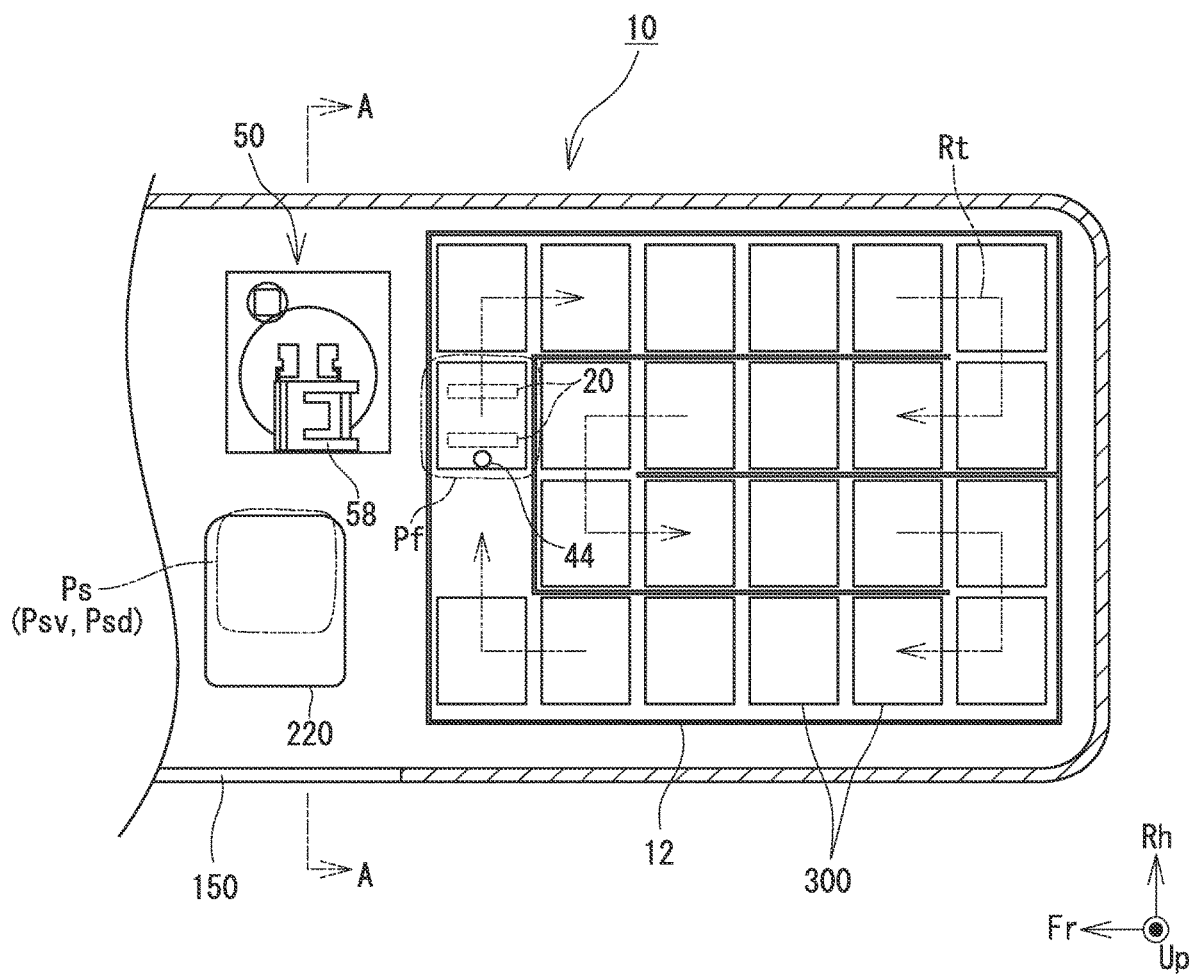
FIG. 2 is a plan view of the cargo handling system.
Figure 3:
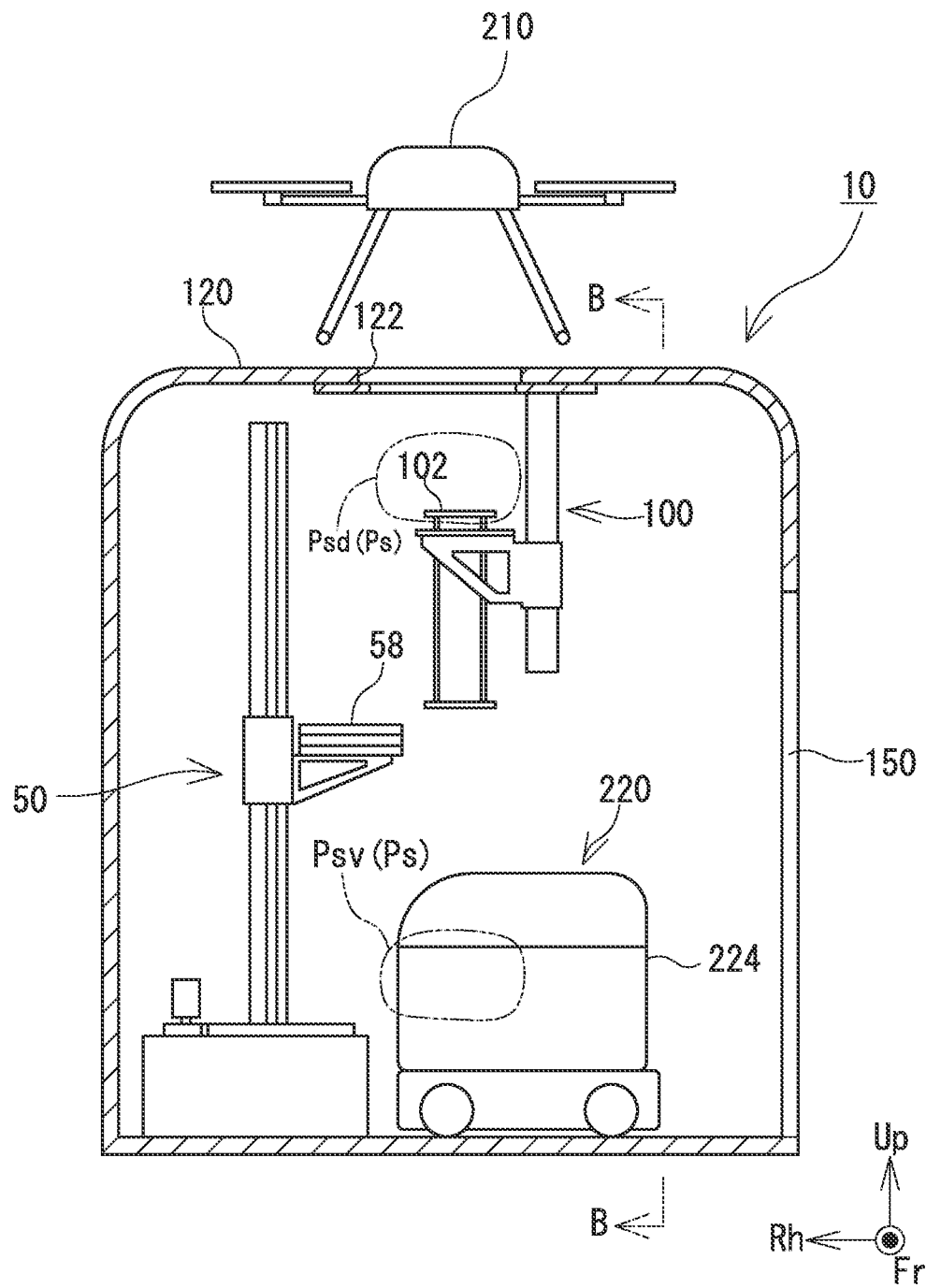
FIG. 3 is a partial cross-sectional view taken along line A-A in FIG. 2.
Figure 4:
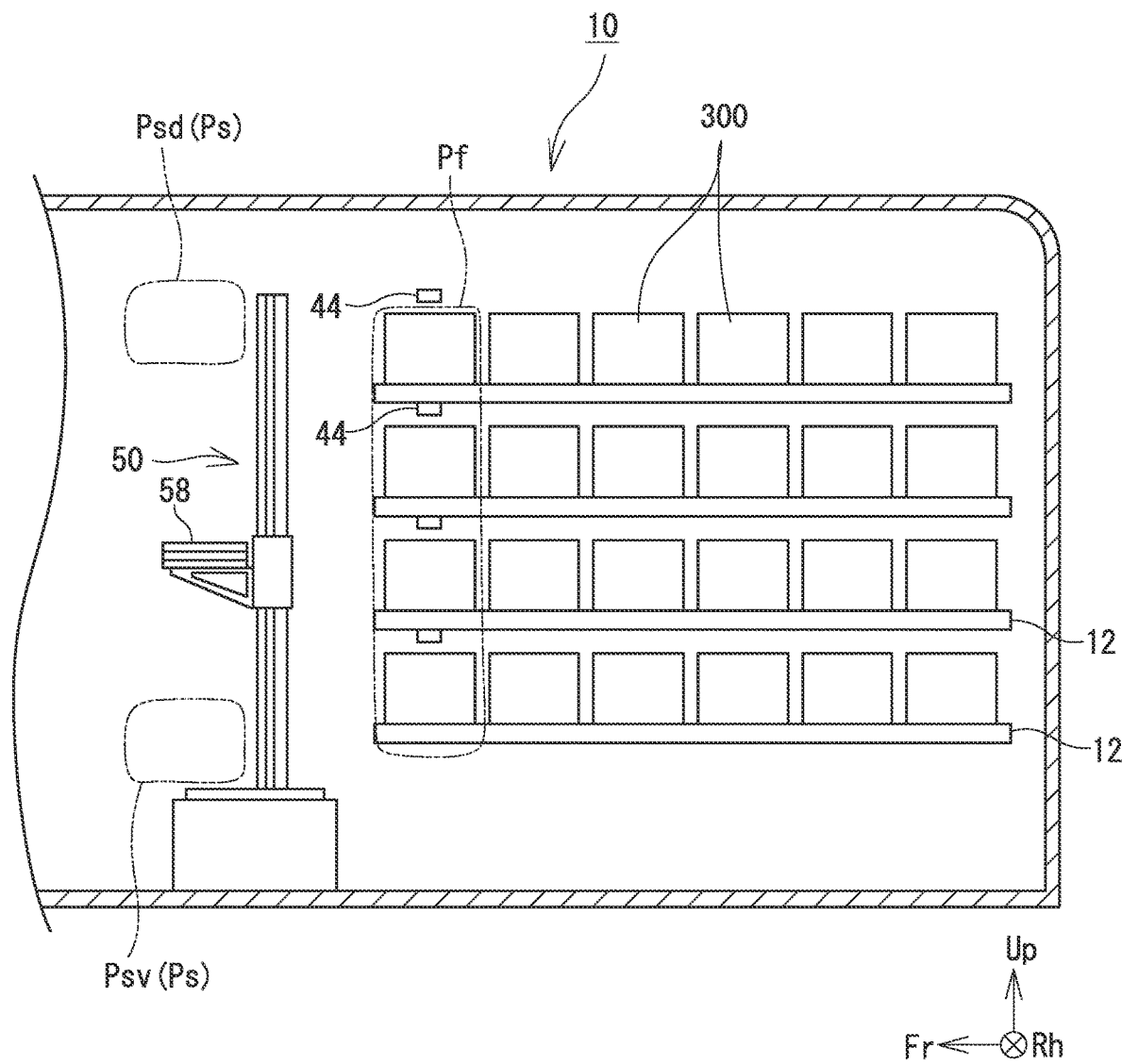
FIG. 4 is a partial cross-sectional view taken along line B-B in FIG. 3.

Hereinafter, a configuration of a cargo handling system 10 will be described with reference to the drawings. FIG. 1 is a schematic perspective view of the cargo handling system 10, and FIG. 2 is a plan view of the cargo handling system 10. FIG. 3 is a partial cross-sectional view taken along line A-A in FIG. 2, and FIG. 4 is a partial cross-sectional view taken along line B-B in FIG. 3. In the following drawings, "Fr," "Up," and "Rh" indicate the front side, the upper side, and the right side of a vehicle, respectively.

The cargo handling system 10 of this example is mounted on a vehicle. This vehicle transports a cargo 300 in cooperation with an unmanned carrier. The unmanned carrier includes, for example, an unmanned ground vehicle (hereinafter referred to as "UGV") 220 that travels on the ground and transports the cargo 300, and a drone 210 that flies and transports the cargo 300. It is noted that, hereinafter, in a case where the UGV 220 and the drone 210 are not distinguished, each is referred to as an "unmanned carrier." Usually, such an unmanned carrier is smaller than a vehicle, and thus can enter the premises of an individual's house or indoors, and is excellent in mobility. On the other hand, the unmanned carrier has a shorter cruising distance than that of the vehicle. Therefore, the unmanned carrier is responsible only for transportation from the vicinity of a delivery destination to the delivery destination. A vehicle transports the cargo 300 from a departure position to the vicinity of a delivery destination.

The cargo handling system 10 stores the cargo 300 in a vehicle, picks up the cargo 300 requested from the unmanned carrier, and delivers the cargo 300 to the unmanned carrier. That is, the delivery of the cargo 300 from the vehicle to the unmanned carrier is automatically performed by the cargo handling system 10 without manual operation. Hereinafter, a description will be mainly given as to a case where the cargo 300 is delivered from the cargo handling system 10 to the unmanned carrier, but the cargo 300 may be delivered from the unmanned carrier to the vehicle. That is, after receiving the cargo 300 from a shipper, the unmanned carrier may move to a vehicle and deliver the cargo 300 to the cargo handling system 10.

Overall Configuration of Cargo Handling System

Next, an overall configuration of the cargo handling system 10 will be briefly described. As described above, the cargo handling system 10 is mounted on a vehicle. No particular limitation is imposed on the configuration of the vehicle on which the cargo handling system 10 is mounted, but a box-type or truck-type vehicle capable of loading a large number of cargos 300 is usually selected. The vehicle of the present example is a box type in which the back surface rises almost vertically. A door opening 150 (refer to FIGS. 2 and 3) used when an operator or the UGV 220 enters or exits the vehicle is formed on the side surface of the vehicle. When the UGV 220 enters or exits the vehicle, a ramp (not illustrated) is stretched from the lower end of the door opening 150 toward the road surface. In addition, a back door opening (not illustrated) used to load the cargo 300 is formed on the back surface of the vehicle.

The cargo handling system 10 includes a storage conveyor 12 (not illustrated in FIG. 3) that stores the plurality of cargos 300, a stacker 50 that receives the cargo 300 from the storage conveyor 12 and delivers the cargo 300 to the unmanned carrier, a relay apparatus 100 (only a lifting-and-lowering plate 102 of the relay apparatus 100 is illustrated in FIG. 1, and the same is not illustrated in FIGS. 2 and 4) that relays between the stacker 50 and the drone 210, and a controller 130 that manages operations of these components.

The storage conveyor 12 is disposed at a rear portion of the vehicle, and has a horizontal upper surface on which the plurality of cargos 300 can be placed. In this example, as illustrated in FIG. 4, a plurality of (four in the illustrated example) storage conveyors 12 are stacked and disposed in the vertical direction. In FIG. 1, the storage conveyors 12 in the second and subsequent stages are not illustrated, in order to easily view the configuration of the other members. The plurality of cargos 300 are placed on each storage conveyor 12. Therefore, each of the plurality of storage conveyors 12 functions as a shelf that stores a large number of cargos 300.

The storage conveyor 12 circularly conveys the cargo 300 along a one-stroke conveyance route Rt (refer to FIG. 2). As is clear from FIG. 2, the conveyance route Rt is a one-stroke shape that returns to a start point without passing through the same route two or more times after starting from the start point.

A first transfer position Pf (refer to FIGS. 2 and 4) at which the cargo 300 is transferred to and from the stacker 50 is set at a position adjacent to the stacker 50 in the middle of the conveyance route Rt. When any cargo 300 is requested from the stacker 50, the storage conveyor 12 moves the requested cargo 300 to the first transfer position Pf along the conveyance route Rt. The first transfer position Pf is provided with a lifter 20 (refer to FIG. 2) configured to transfer the cargo 300. The target cargo 300 is delivered to the stacker 50 by the lifter 20, as will be described later.

The stacker 50 is a device that transfers the cargo 300 between the first transfer position Pf and a second transfer position Ps (refer to FIGS. 2 to 4). The second transfer position Ps is provided at a position separated from the first transfer position Pf in the horizontal direction, and is a position at which the cargo 300 is transferred between the stacker 50 and the unmanned carrier. In the present example, the unmanned carrier includes the UGV 220 entering the vehicle and the drone 210 landing on the ceiling of the vehicle. It is noted that illustration of the UGV 220 is omitted in FIG. 4, and illustration of the drone 210 is omitted in FIGS. 2 and 4.

The second transfer position Ps includes a UGV transfer position Psv at which the cargo 300 is transferred between the stacker 50 and the UGV 220, and a drone transfer position Psd at which the cargo 300 is transferred between the stacker 50 and the drone 210. Note that, in a case where the cargo 300 is delivered from the stacker 50 to the drone 210 or from the drone 210 to the stacker 50, the relay apparatus 100 is interposed therebetween. Therefore, the drone transfer position Psd is precisely a position at which the cargo 300 is transferred between the stacker 50 and the relay apparatus 100.

As illustrated in FIGS. 2 to 4, the UGV transfer position Psv is a position between the stacker 50 and the door opening 150, and is set at substantially the same height position as a container 224 of the UGV 220. The drone transfer position Psd is set in the vicinity of the ceiling of the vehicle interior and immediately above the UGV transfer position Psv. Therefore, the positions of the UGV transfer position Psv and the drone transfer position Psd in the horizontal direction substantially coincide with each other.

The stacker 50 is fixed at a position in the vehicle adjacent to the vehicle front side of the first transfer position Pf and adjacent to the right side in the vehicle width direction of the UGV transfer position Psv. The stacker 50 includes a hand 58 that holds the cargo 300. The hand 58 can move upwards and downwards in the vertical direction and can rotate in the horizontal plane. Further, the hand 58 can expand and contract in the horizontal direction. Then, the cargo 300 is transferred between the first transfer position Pf and the second transfer positions Psv and Psd by allowing the hand 58 to be lifted or lowered, to be rotated, and to expand or contract in a state where the cargo 300 is placed on the hand 58.

As illustrated in FIG. 3, the drone 210 lands on a roof 120 of the vehicle. A roof opening 122 configured to allow the cargo 300 to pass therethrough is formed in the roof 120. The relay apparatus 100 is provided immediately below the roof opening 122 and immediately above the UGV transfer position Psv. It is noted that illustration of the relay apparatus 100 is omitted in FIGS. 1, 2, and 4 in order to make other members easily viewable.

The relay apparatus 100 delivers the cargo 300 received from the stacker 50 to the drone 210, and delivers the cargo 300 received from the drone 210 to the stacker 50. More specifically, the relay apparatus 100 includes the lifting-and-lowering plate 102 configured to be movable inside and outside the vehicle through the roof opening 122. When the cargo 300 is delivered from the stacker 50 to the drone 210, the relay apparatus 100 moves the lifting-and-lowering plate 102 up to the upper side of the roof 120 in a state where the cargo 300 received from the stacker 50 is placed on the lifting-and-lowering plate 102. The drone 210 holds the cargo 300 placed on the lifting-and-lowering plate 102 with a hand mechanism (not illustrated) mounted on the drone 210. In a case where the cargo 300 is delivered from the drone 210 to the stacker 50, a procedure reverse to the above procedure is executed.

The controller 130 controls driving of the storage conveyor 12, the stacker 50, and the relay apparatus 100 described above. The controller 130 is physically a computer including a processor 132 and a memory 134. The "computer" also encompasses a microcontroller in which a computer system is incorporated into one integrated circuit. Furthermore, the processor 132 refers to a processor in a broad sense, and includes a general-purpose processor (for example, a CPU: Central Processing Unit, or the like) or a dedicated processor (for example, a GPU: Graphics Processing Unit, ASIC: Application Specific Integrated Circuit, an FPGA: Field Programmable Gate Array, a PLD: Programmable Logic Device, or the like). Furthermore, the memory 134 may include at least one of a semiconductor memory (for example, a RAM, a ROM, a solid state drive, or the like) and a magnetic disk (for example, a hard disk drive or the like). In addition, the controller 130 does not need to be physically one element, and may be a combination of a plurality of computers existing at physically separated positions.

Flow of Cargo

Next, a brief description will be given as to a flow of delivering the specific cargo 300 stored on the storage conveyor 12 to the UGV 220 and the drone 210. The controller 130 determines the position of the target cargo 300 in the storage conveyor 12. When the target cargo 300 is not located at the first transfer position Pf, the storage conveyor 12 conveys the cargo 300 to the first transfer position Pf along the conveyance route Rt. Further, the stacker 50 moves the hand 58 up to the first transfer position Pf by allowing the hand 58 to be lifted or lowered, to be rotated, and to expand or contract. Thereafter, the cargo 300 conveyed up to the first transfer position Pf by the storage conveyor 12 is delivered to the hand 58 moved up to the first transfer position Pf.

When the cargo 300 is placed on the hand 58 at the first transfer position Pf, the stacker 50 moves the hand 58 up to the UGV transfer position Psv or the drone transfer position Psd by allowing the hand 58 to be lifted or lowered, to be rotated, and to expand or contract.

When delivering the cargo 300 to the UGV 220, the stacker 50 moves the hand 58 up to the UGV transfer position Psv. Thereafter, the cargo 300 placed on the hand 58 is delivered to the container 224 of the UGV 220. No particular limitation is imposed on the specific form of this delivery. Therefore, for example, the cargo 300 may be dropped from the hand 58 toward the container 224. In addition, the container 224 may be provided with a hand mechanism or the like that holds and conveys the cargo 300.

When the cargo 300 is delivered to the drone 210, the stacker 50 moves the hand 58 to the drone transfer position Psd. In addition, the relay apparatus 100 moves the lifting-and-lowering plate 102 up to the drone transfer position Psd. When both the hand 58 and the lifting-and-lowering plate 102 reach the drone transfer position Psd, the cargo 300 is delivered from the hand 58 to the lifting-and-lowering plate 102. When receiving the cargo 300, the relay apparatus 100 raises the lifting-and-lowering plate 102 and moves the same up to the upper side of the roof 120. The drone 210 receives the cargo 300 placed on the lifting-and-lowering plate 102 by the hand mechanism. In this case as well, no particular limitation is imposed on the specific form of delivery of the cargo.

Here, in a general warehouse system, a cargo is stored on a fixed shelf, and when a specific cargo is taken out from the shelf, the stacker often moves in the warehouse to near the cargo. In the case of such a configuration, it is naturally necessary to secure a movement space for the stacker in the warehouse. This is not a major problem so long as the warehouse system is provided outside the vehicle and has a large site. However, since the space in the vehicle is limited, in a case where the movement space for the stacker is secured, the storage space for cargos is reduced accordingly, and the number of cargos that can be stored in the vehicle is reduced. This causes deterioration in transportation efficiency of a cargo.

On the other hand, as is clear from the above description, in the present example, while the cargo 300 is moved along the one-stroke conveyance route Rt in the storage conveyor 12, the stacker 50 itself is not moved in the vehicle. Therefore, it is not necessary to secure a movement space for the stacker 50. As a result, according to the present example, a large storage space for the cargo 300 can be secured, and transportation efficiency of the cargo 300 can be improved.

Configuration of Storage Conveyor

Figure 5:
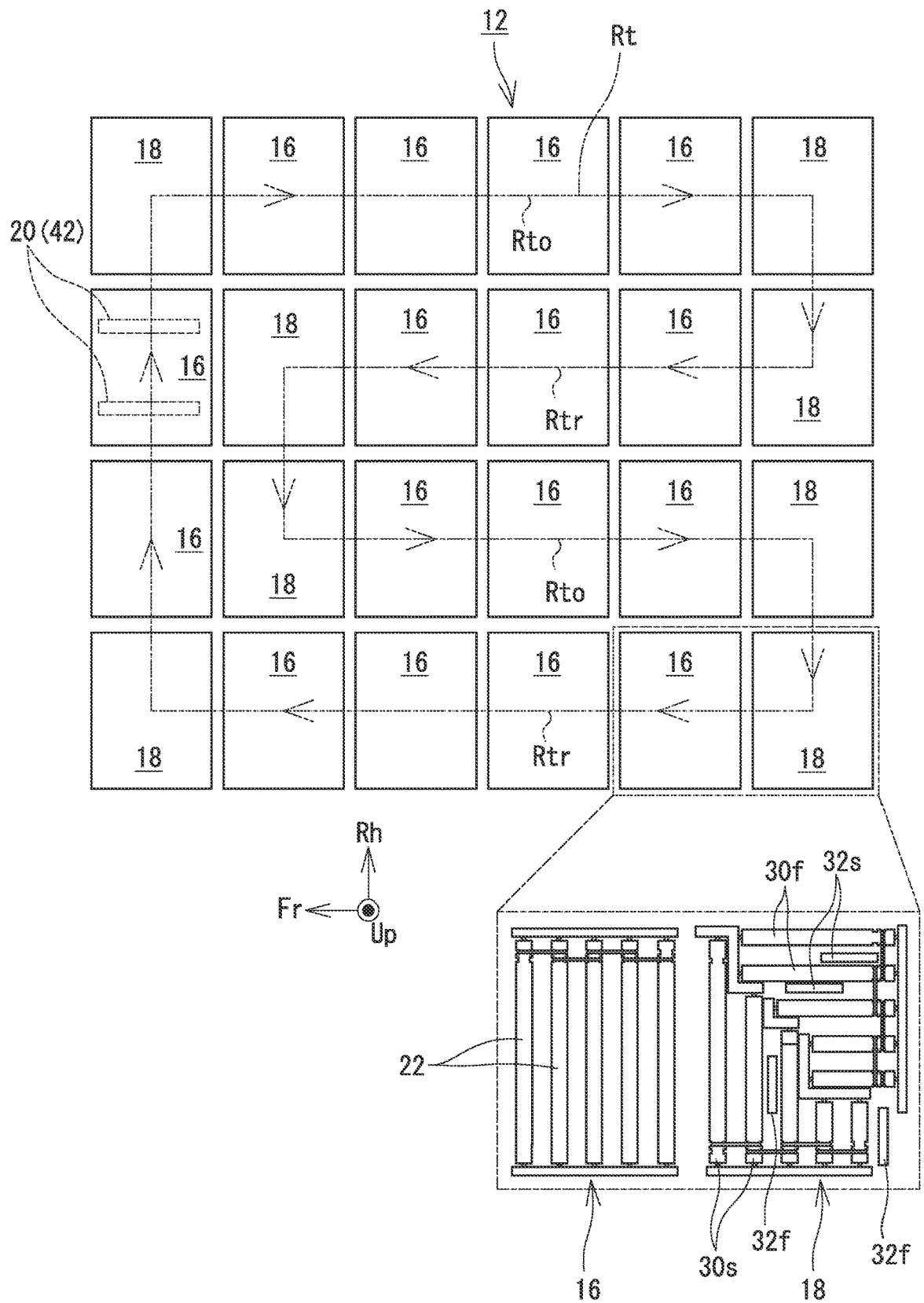
FIG. 5 is a schematic plan view of a storage conveyor.

Next, the configuration of the storage conveyor 12 will be described in detail. FIG. 5 is a schematic plan view of the storage conveyor 12. As described above, the storage conveyor 12 circularly conveys the cargo 300 along the one-stroke conveyance route Rt. In the case of the present example, the conveyance route Rt having a one-stroke shape has a forward route Rto traveling toward the rear side of the vehicle and a return route Rtr traveling toward the front side of the vehicle, wherein the forward route Rto and the return route Rtr are turned back an odd number of times in a zigzag shape so as to be alternately arranged in the vehicle width direction, and travels in the vehicle width direction so as to return to a departure point. In the conveyance route Rt of this example, at each of a plurality of turn-back portions the direction is changed twice at a right angle so that the traveling direction is turned back in the opposite direction. A right angle turn unit 18 to be described later is disposed adjacent to the turn-back portion in the vehicle width direction. By forming the conveyance route Rt into such a shape, it is possible to circularly convey the cargo while keeping the dead space small.

Figure 12A:
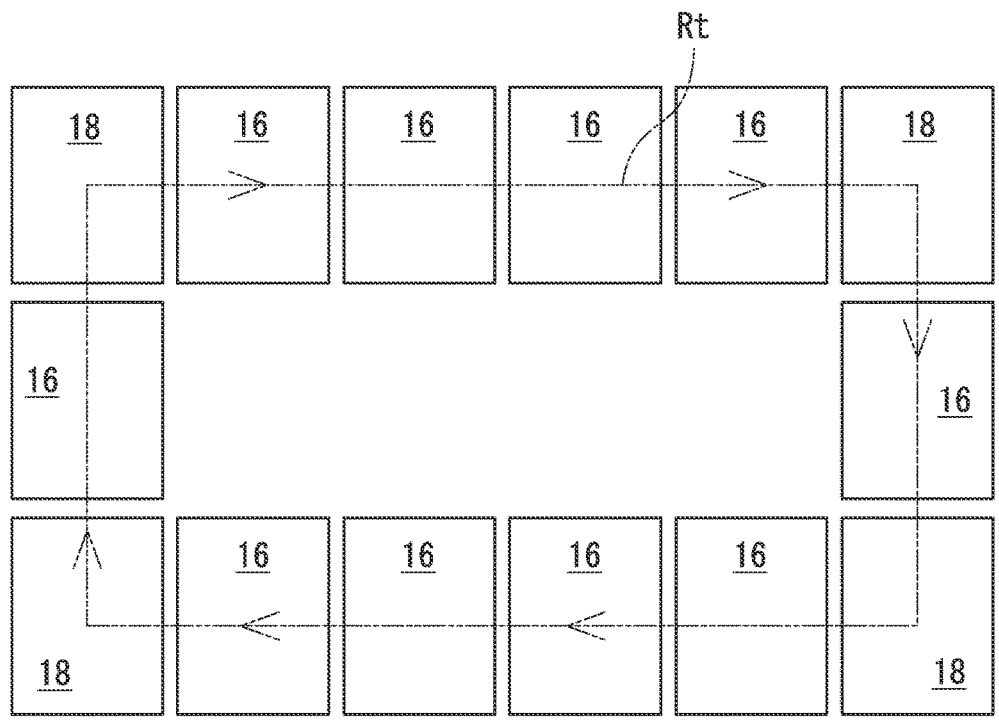
FIG. 12A is a view illustrating another example of a conveyance route.
Figure 12B:
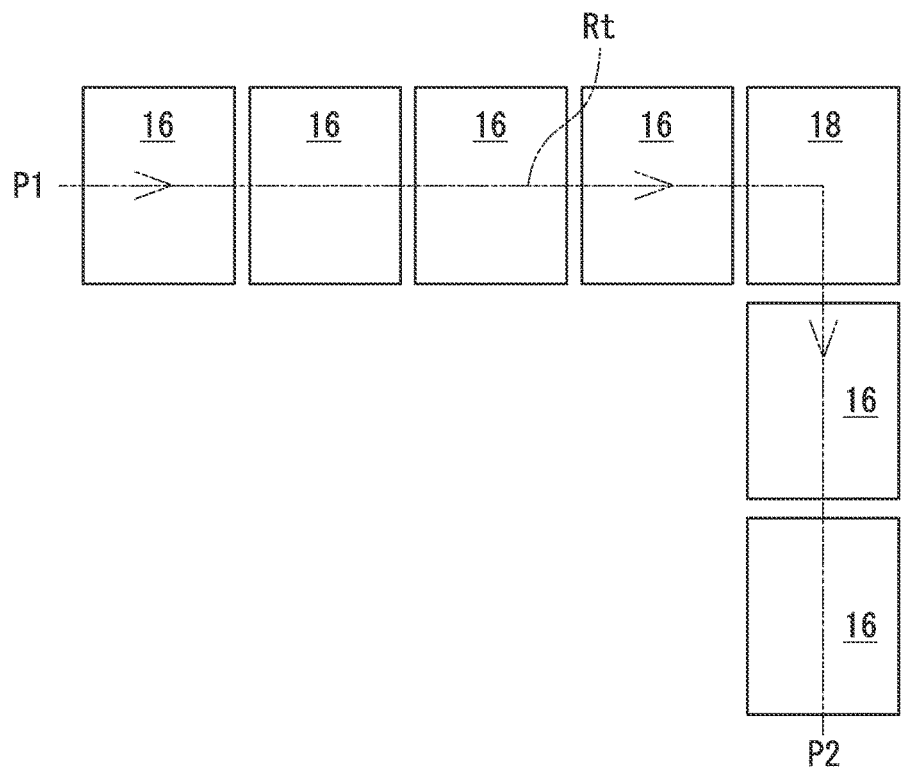
FIG. 12B is a view illustrating another example of the conveyance route.

However, the shape of the conveyance route Rt described here is an example, and the shape of the conveyance route Rt may be appropriately changed so long as the conveyance route Rt includes the right angle turn unit 18 that changes the traveling direction of the cargo at a right angle. Therefore, as illustrated in FIG. 12A, the conveyance route Rt may be a substantially rectangular shape in which the center is an empty space. In addition, the conveyance route Rt does not need to have a one-stroke shape, and may have a shape in which a start point P1 and an end point P2 are separated from each other and bent at a right angle one or more times in the middle as illustrated in FIG. 12B.

The storage conveyor 12 is configured by combining a plurality of conveyance units. As illustrated in FIG. 5, types of the conveyance unit include a straight unit 16 that conveys the cargo 300 in a straight line, and a right angle turn unit 18 that conveys the cargo 300 while bending the traveling direction of the cargo 300 at a right angle. As described in detail later, each of the straight unit 16 and the right angle turn unit 18 includes a plurality of rollers, and a motor that drives the rollers. The upper surface of each of the straight unit 16 and the right angle turn unit 18 functions as a conveyance path on which the cargo 300 is conveyed. The straight unit 16 and the right angle turn unit 18 have outer shapes of substantially the same size. Therefore, the straight unit 16 and the right angle turn unit 18 can be arranged in a matrix shape without interfering with each other or leaving a large gap. By configuring the storage conveyor 12 using the straight unit 16 and the right angle turn unit 18, the size of the entire storage conveyor 12 and the conveyance route Rt can be easily changed by only changing the number of the conveyance units 16 and 18 and the arrangement thereof.

Figure 6:
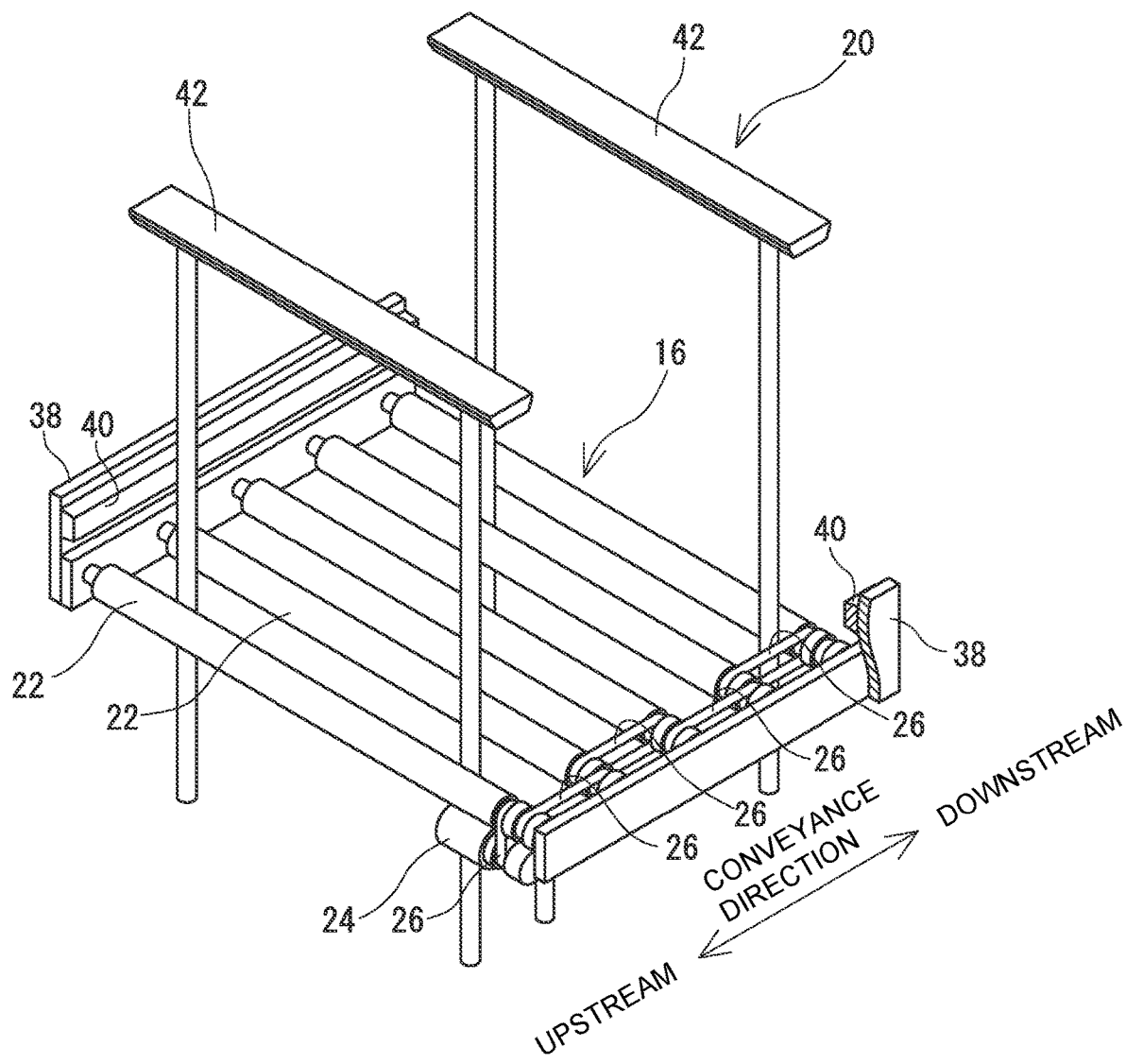
FIG. 6 is a perspective view of a straight unit and a lifter.

FIG. 6 is a perspective view of the straight unit 16 and the lifter 20. The straight unit 16 includes a plurality of (five in the illustrated example) conveyance rollers 22 arranged in parallel. The axial directions of the respective conveyance rollers 22 are parallel to the horizontal direction and orthogonal to the conveyance direction of the cargo 300. Hereinafter, the axial direction of the conveyance roller 22 is referred to as a "conveyance path width direction." The plurality of conveyance rollers 22 are connected in a chained manner by a plurality of belts 26. Each belt 26 is stretched between two adjacent conveyance rollers 22, and transmits rotational power of one conveyance roller 22 to the other conveyance roller 22. Therefore, the plurality of conveyance rollers 22 rotate in synchronization with each other.

A conveyor motor 24 is disposed below the conveyance roller 22. A belt 26 configured to transmit rotational power is also stretched between an output shaft of the conveyor motor 24 and one conveyance roller 22. When the conveyor motor 24 rotates in the forward direction, the plurality of conveyance rollers 22 rotate in a direction of sending out the cargo 300 to the downstream side in the conveyance direction. When the conveyor motor 24 rotates in the reverse direction, the plurality of conveyance rollers 22 rotate in a direction of sending out the cargo 300 to the upstream side in the conveyance direction.

On the opposite side of the straight unit 16, there is provided a partition wall 38 that defines a boundary of a conveyance path of the cargo 300. A sliding rail 40 is attached to the partition wall 38. The sliding rail 40 is a member elongated in the conveyance direction, and protrudes inwards in the conveyance path width direction from the partition wall 38. Therefore, although the cargo 300 abuts on the sliding rail 40, the same does not abut on the partition wall 38. The surface of the sliding rail 40 is made of a material having a low coefficient of friction such as polytetrafluoroethylene, fluororesin, or the like. The sliding rail 40 is provided, thereby making it possible to prevent the cargo 300 from being rubbed against the partition wall 38 and deteriorating.

Among the plurality of straight units 16, the lifter 20 is provided below the straight unit 16 disposed at the first transfer position Pf. The lifter 20 includes a pair of lifting-and-lowering bars 42. Each of the lifting-and-lowering bars 42 is a bar that is formed to extend in the conveyance path width direction and that is thinner than a gap between two adjacent conveyance rollers 22. The lifting-and-lowering bar 42 is positioned in the gap between two adjacent conveyance rollers 22 in plan view. Further, the lifting-and-lowering bar 42 can be lifted and lowered between a retreat position below the straight unit 16 and a lift position above the straight unit 16. The lifting and lowering of the lifting-and-lowering bar 42 may be performed by a rectilinear mechanism using a motor as a power source, or may be performed by an expansion and contraction mechanism having a hydraulic or pneumatic cylinder.

When the pair of lifting-and-lowering bars 42 ascends from the retreat position to the lift position with the cargo 300 placed on the straight unit 16, the cargo 300 is supported by the pair of lifting-and-lowering bars 42 and lifted from the straight unit 16. In this state, the cargo 300 is delivered from the lifting-and-lowering bar 42 to the hand 58 of the stacker 50.

Figure 7:
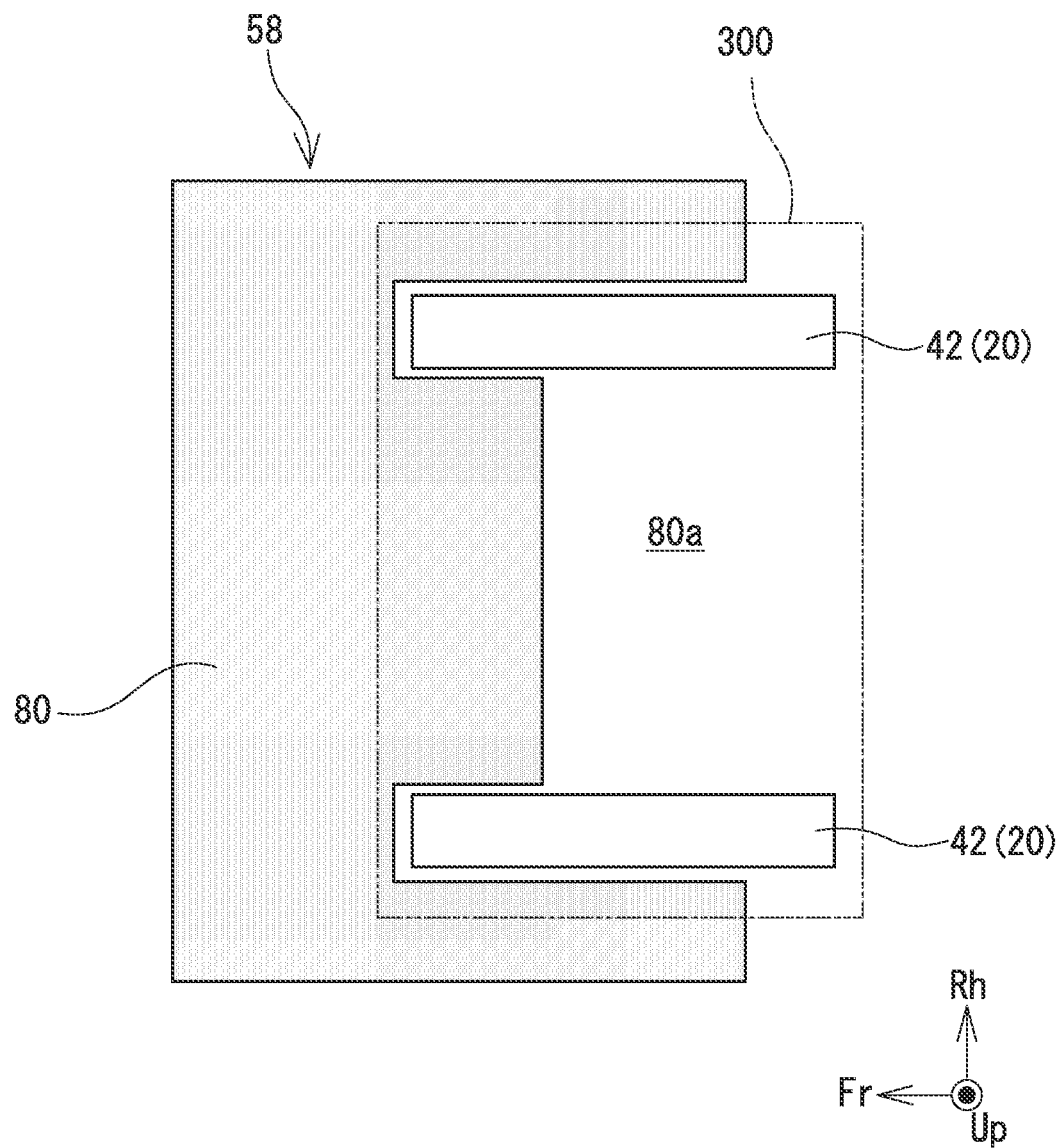
FIG. 7 is a plan view of the lifter and a fork plate.

This will be briefly described with reference to FIG. 7. FIG. 7 is a plan view of the lifter 20 and a fork plate 80. The stacker 50 includes the hand 58 (refer to FIG. 1) that can be lifted or lowered, rotated, and expand or contract. The hand 58 expands and contracts by sliding a plurality of plates stacked in the thickness direction against each other. The fork plate 80 is a plate disposed on the uppermost side of the hand 58. As illustrated in FIG. 7, a notch 80a through which the lifting-and-lowering bar 42 can pass is formed at the end portion in the advancing direction of the fork plate 80.

When the cargo 300 is delivered from the storage conveyor 12 to the stacker 50, first, the lifting-and-lowering bar 42 moves upwards to lift the cargo 300 placed on the straight unit 16. Subsequently, the stacker 50 causes the hand 58 to be lifted or lowered, to be rotated, and to expand and contract to position the fork plate 80 between the lifting-and-lowering bar 42 and the straight unit 16. In this state, when the lifting-and-lowering bar 42 is lowered up to the lower side of the straight unit 16, the cargo 300 is caught by the fork plate 80 and placed thereon. Accordingly, the delivery of the cargo 300 is completed. When the cargo 300 is delivered from the stacker 50 to the storage conveyor 12, a procedure reverse to the above procedure is performed.

Figure 8:
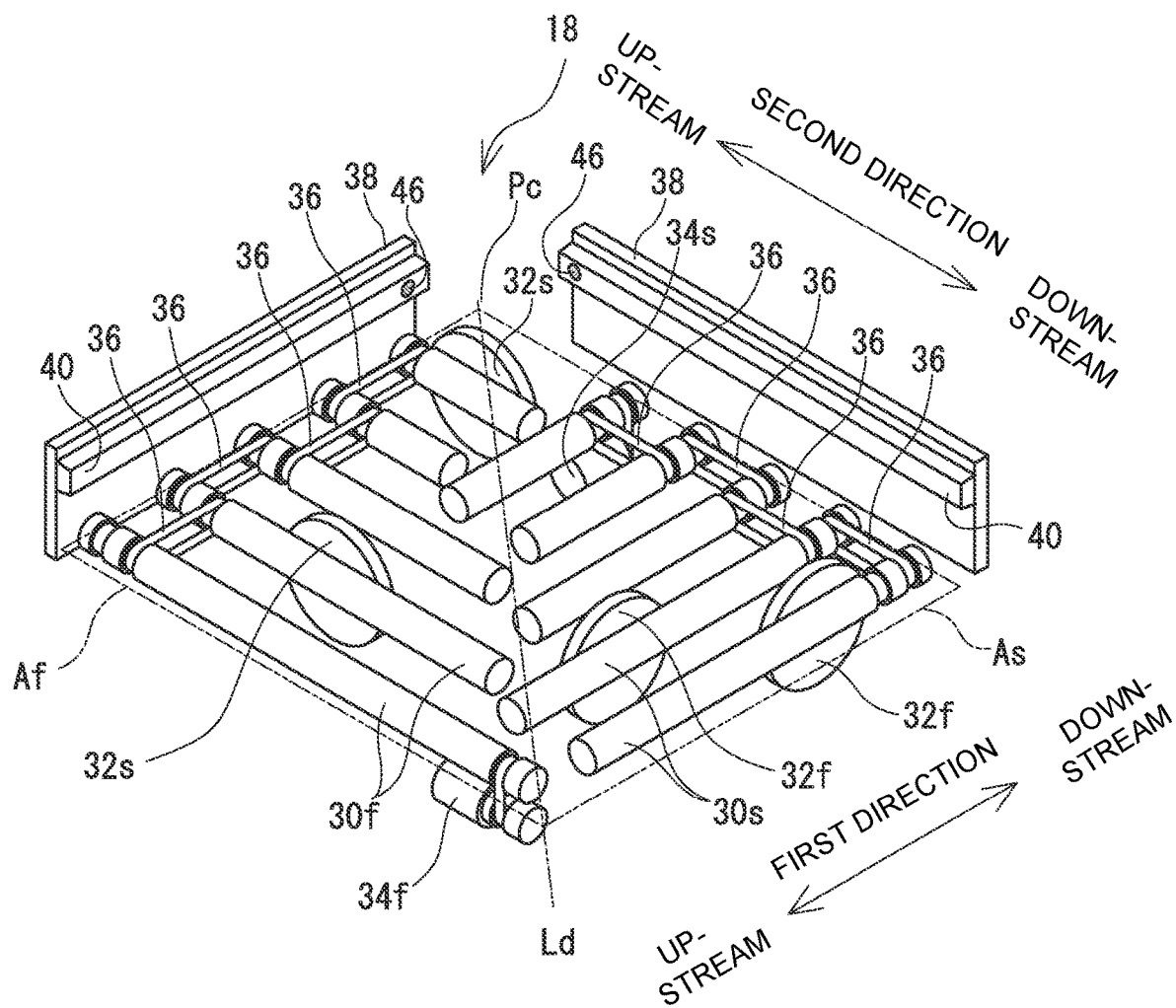
FIG. 8 is a perspective view of a right angle turn unit.
Figure 9:
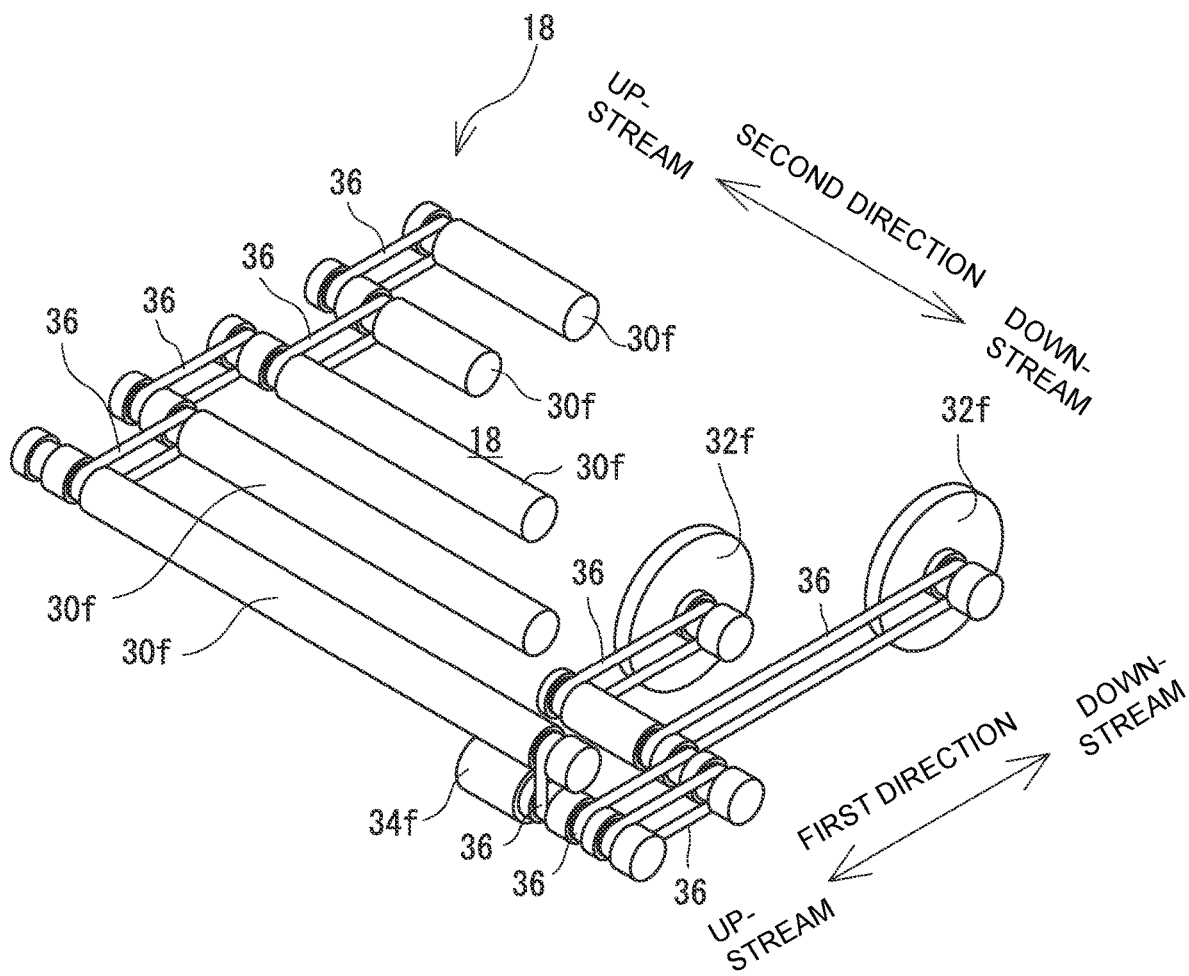
FIG. 9 is a perspective view of the right angle turn unit in which some components are not illustrated.

Next, a configuration of the right angle turn unit 18 will be described with reference to FIGS. 8 and 9. FIG. 8 is a perspective view of the right angle turn unit 18, and FIG. 9 is a perspective view of the right angle turn unit 18 in which some components are not illustrated. The right angle turn unit 18 conveys the cargo 300 by changing, at a right angle, the conveyance direction of the cargo 300 from a first direction to a second direction orthogonal to the first direction.

The right angle turn unit 18 has a substantially quadrangular shape in plan view. Hereinafter, a corner portion which is a downstream end in the first direction and an upstream end in the second direction of the quadrangle is referred to as a "corner portion Pc." The right angle turn unit 18 can be roughly divided into two areas Af and As with a diagonal line Ld passing through the corner portion Pc of the quadrangle as a boundary. A plurality of first conveyance rollers 30f are disposed in the first area Af on the upstream side in the second direction of the diagonal line Ld. The first conveyance roller 30f is a roller that rotates around an axis parallel to the second direction and rotates forward to send the cargo 300 to the downstream side in the first direction. The plurality of the first conveyance rollers 30f are disposed with a gap therebetween in the first direction. The first conveyance roller 30f closer to the downstream end in the first direction has a shorter axial length so that the plurality of first conveyance rollers 30f are substantially accommodated in the first area Af.

A plurality of second conveyance rollers 30s are disposed in the second area As on the upstream side in the second direction of the diagonal line Ld. The second conveyance roller 30s is a roller that rotates around an axis parallel to the first direction and rotates forward to send the cargo 300 to the downstream side in the second direction. The plurality of the second conveyance rollers 30s are disposed with a gap therebetween in the second direction. Further, the second conveyance roller 30s closer to the upstream end in the second direction has a shorter axial length so that the plurality of second conveyance rollers 30s are substantially accommodated in the second area As. The diameter of the second conveyance roller 30s is equal to the diameter of the first conveyance roller 30f, and the height of the top portion of the second conveyance roller 30s (that is, the portion in contact with bottom surface of cargo 300) coincides with the height of the top portion of the first conveyance roller 30f.

In the first area Af, a plurality of (two in the illustrated example) second assist rollers 32s are further disposed. The second assist roller 32s is a roller that rotates around an axis parallel to the first direction; that is, rotates around an axis parallel to the second conveyance roller 30s. The axial dimension of the second assist roller 32s is sufficiently smaller than a gap between two adjacent first conveyance rollers 30f, and the second assist roller 32s is disposed in the gap. The diameter of the second assist roller 32s is sufficiently larger than the diameter of the first conveyance roller 30f, while the height of the top portion of the second assist roller 32s is equal to the height of the top portion of the first conveyance roller 30f. By disposing the second assist roller 32s in the first area Af in this manner, the cargo 300 can be sent in the second direction by the second assist roller 32s immediately after the cargo 300 enters the right angle turn unit 18; in other words, even at the timing when the contact area between the cargo 300 and the second conveyance roller 30s is small.

In the second area As, a plurality of (two in the illustrated example) first assist rollers 32f are further disposed. The first assist roller 32f is a roller that rotates around an axis parallel to the second direction; that is, rotates around an axis parallel to the first conveyance roller 30f. The axial dimension of the first assist roller 32f is sufficiently smaller than a gap between two adjacent second conveyance rollers 30s, and the first assist roller 32f is disposed in the gap. The diameter of the first assist roller 32f is sufficiently larger than the diameter of the second conveyance roller 30s, while the height of the top portion of the first assist roller 32f is equal to the height of the top portion of the second conveyance roller 30s. By providing the first assist roller 32f, the cargo 300 can be sent in the first direction by the first assist roller 32f even at the timing when the contact area between the cargo 300 and the first conveyance roller 30f is small.

A first conveyor motor 34f is disposed below the first conveyance roller 30f. As illustrated in FIG. 8, rotational power output from the first conveyor motor 34f is transmitted to the plurality of first conveyance rollers 30f and the plurality of first assist rollers 32f via a belt 36. As a result, the plurality of first conveyance rollers 30f and the plurality of first assist rollers 32f rotate in synchronization with each other. As described above, the first assist roller 32f has a larger diameter than the second conveyance roller 30s, and the rotation center of the first assist roller 32f is located below the lower end of the second conveyance roller 30s. With such a configuration, interference between the power transmission member (belt 36 or the like) connecting the first conveyor motor 34f to the first assist roller 32f and the second conveyance roller 30s hardly occurs. As a result, the configuration of the power transmission member can be simplified.

As illustrated in FIG. 8, a second conveyor motor 34s is disposed below the second conveyance roller 30s. Although not illustrated in detail in FIGS. 8 and 9, rotational power output from the second conveyor motor 34s is transmitted to the plurality of second conveyance rollers 30s and the plurality of second assist rollers 32s via the belt 36 in the same manner as that of the first conveyor motor 34f. The second conveyor motor 34s can be driven independently of the first conveyor motor 34f. Therefore, while the first conveyor motor 34f is rotating forward, the second conveyor motor 34s may rotate forward, may rotate rearward, or may stop.

In the present example, the rotational power of the conveyor motors 34f and 34s is transmitted to the rollers 30f, 32f, 30s, and 32s without being decelerated. However, depending on cases, the rotational power may be transmitted to some or all of the rollers 30f, 32f, 30s, and 32s by being decelerated. For example, since the first assist roller 32f has a larger diameter than that of the first conveyance roller 30f, the circumferential speed of the first assist roller 32f is higher than the circumferential speed of the first conveyance roller 30f when the rotational speeds of the first assist roller 32f and the first conveyance roller 30f are the same. The rotational power of the first conveyor motor 34f may be decelerated and transmitted to the first assist roller 32f so that the circumferential speeds of the first assist roller 32f and the first conveyance roller 30f coincide with each other; that is, the rotational speed of the first assist roller 32f becomes lower than the rotational speed of the first conveyance roller 30f. Further, the rotational speeds of the plurality of first conveyance rollers 30f may be changed to be lower or higher toward the downstream side in the first direction.

As illustrated in FIG. 8, the partition wall 38 defining a boundary of the conveyance path stands at the downstream end in the first direction and the upstream end in the second direction of the right angle turn unit 18. The partition wall 38 is also provided with the sliding rail 40. The sliding rail 40 is provided, thereby making it possible to prevent the cargo 300 from being rubbed against the partition wall 38 and deteriorating.

A label (not illustrated) recording cargo information is attached to each cargo 300. The storage conveyor 12 is provided with a label reader 44 (refer to FIGS. 2 and 4) that reads the cargo information recorded on the label. In the cargo information, identification information on the cargo 300, information on a sender of the cargo 300, information on a destination of the cargo 300, and the like are recorded. By providing the label reader 44, the cargo 300 can be appropriately identified. It is noted that no particular limitation is imposed on the number of the label readers 44 and the installation positions thereof. For example, the label reader 44 may be provided at the first transfer position Pf. By providing the label reader 44 at such a position, the cargo 300 to be delivered to the stacker 50 can be clearly identified, thereby making it possible to reliably prevent erroneous delivery of another cargo 300 that is not requested from the stacker 50.

It is noted that the label attached to the cargo 300 may be a print medium on which the cargo information is printed in the form of characters or barcodes, or may be an IC tag in which the cargo information is recorded as electronic information. When the cargo information is printed in the form of characters, the label reader 44 includes a camera and an OCR device that captures and reads character information. In addition, in a case where the cargo information is printed in the form of a barcode, the label reader 44 includes a barcode reader that reads the barcode. When the label is an IC tag, the label reader 44 includes an IC reader that communicates with the IC tag and reads information.

Control of Storage Conveyor

Next, control of conveying the cargo 300 by the storage conveyor 12 will be described. As described above, in the present example, the cargo 300 is circularly conveyed along the conveyance route Rt by combining the straight unit 16 and the right angle turn unit 18. Here, the right angle turn unit 18 changes the traveling direction of the cargo 300 to a right angle by adjusting the rotation direction and the drive timing of the two types of conveyance rollers 30$f$ and 30$s$ and the two types of assist rollers 32$f$ and 32$s$. The reason why the traveling direction of the cargo 300 is changed to the right angle in this manner will be described with reference to FIG. 10.

Figure 10:
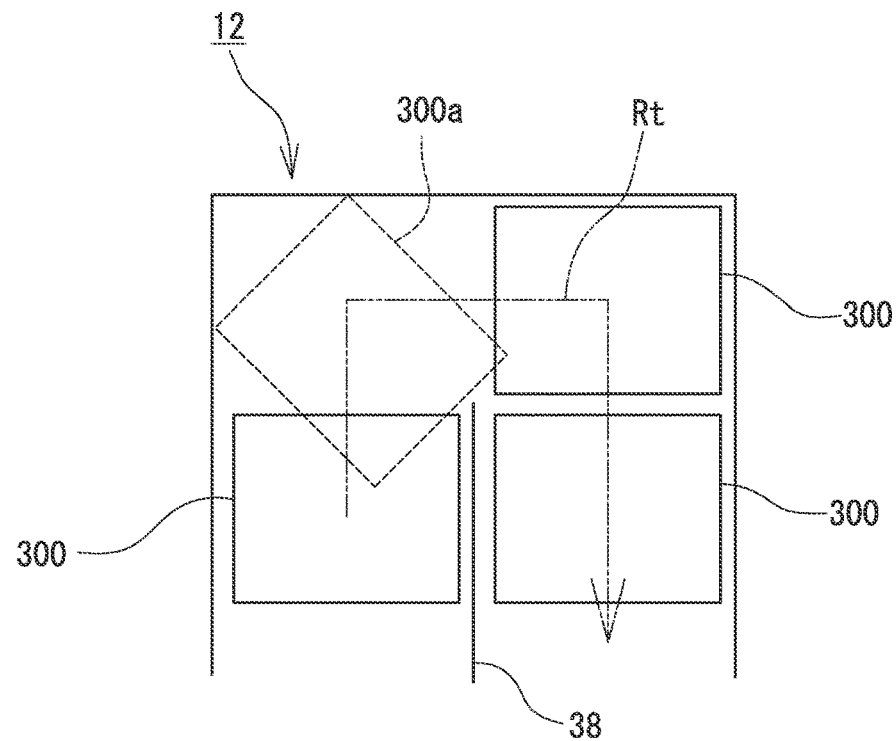
FIG. 10 is a view illustrating the reason why a traveling direction of a cargo is changed to a right angle.
Figure 10:
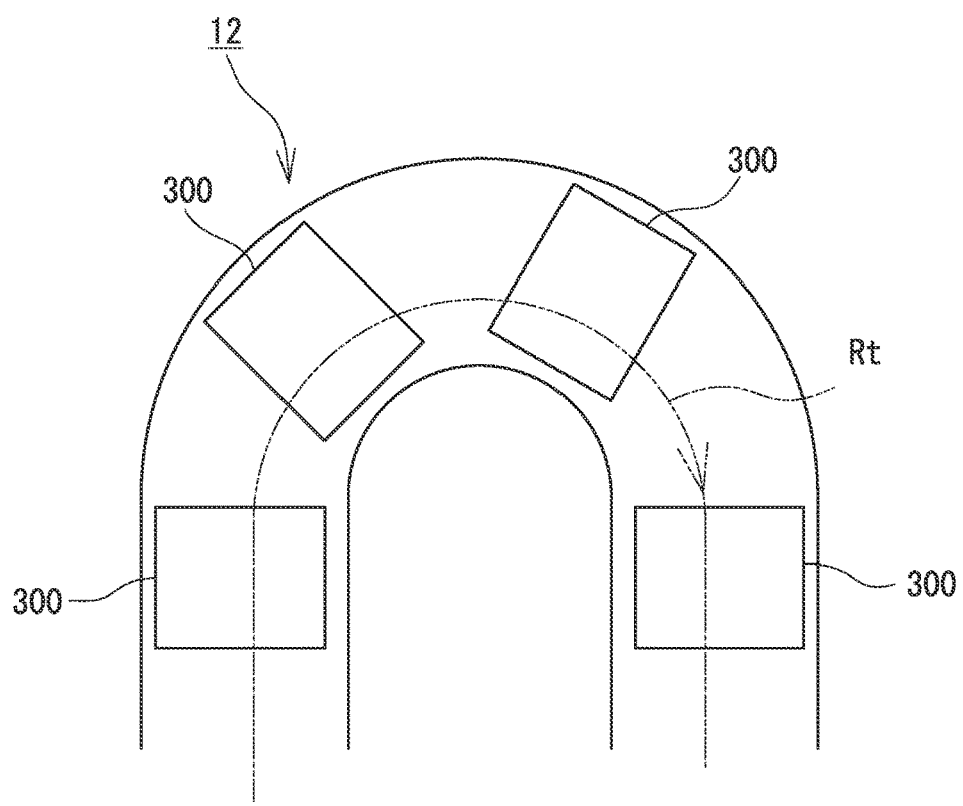

As illustrated in FIG. 10, a case where the cargo 300 is turned back by approximately 180 degrees and conveyed is considered. In this case, as illustrated in the lower part of FIG. 10, it is conceivable that the cargo 300 is moved in the arc shape and turned back. However, in this case, a large gap is formed between the forward path and the return path of the cargo 300. Such a gap therebetween becomes a dead space that cannot be used for conveyance or storage of the cargo 300. On the other hand, as illustrated in the upper part of FIG. 10, when the cargo 300 is bent at the right angle twice, a gap between the forward path and the return path can be theoretically eliminated. Therefore, in a case where the cargo 300 is configured to be redirected at the right angle, occurrence of a dead space can be effectively prevented, and utilization efficiency of the space can be improved.

However, the storage conveyor 12 of this example is mounted on a vehicle. In this case, the angle of the upper surface of the storage conveyor 12 and the direction of gravity acting on the cargo 300 placed on the storage conveyor 12 change depending on the gradient of the road surface on which the vehicle is grounded. As a result, depending on the gradient of the road surface, the cargo 300 may be inclined with respect to the conveyance path, and the cargo 300 may not be conveyed at a right angle. For example, consideration will be given as to a case where the posture of a cargo 300$a$ is inclined due to the gradient of the road surface in the process of bending the traveling direction of the cargo 300$a$ at a right angle as in the cargo 300$a$ illustrated by a broken line in the upper part of FIG. 10. In this case, a part of the cargo 300$a$ is caught by the partition wall 38 of the conveyance unit in the process of movement, and the cargo 300$a$ cannot be appropriately delivered.

Figure 11:
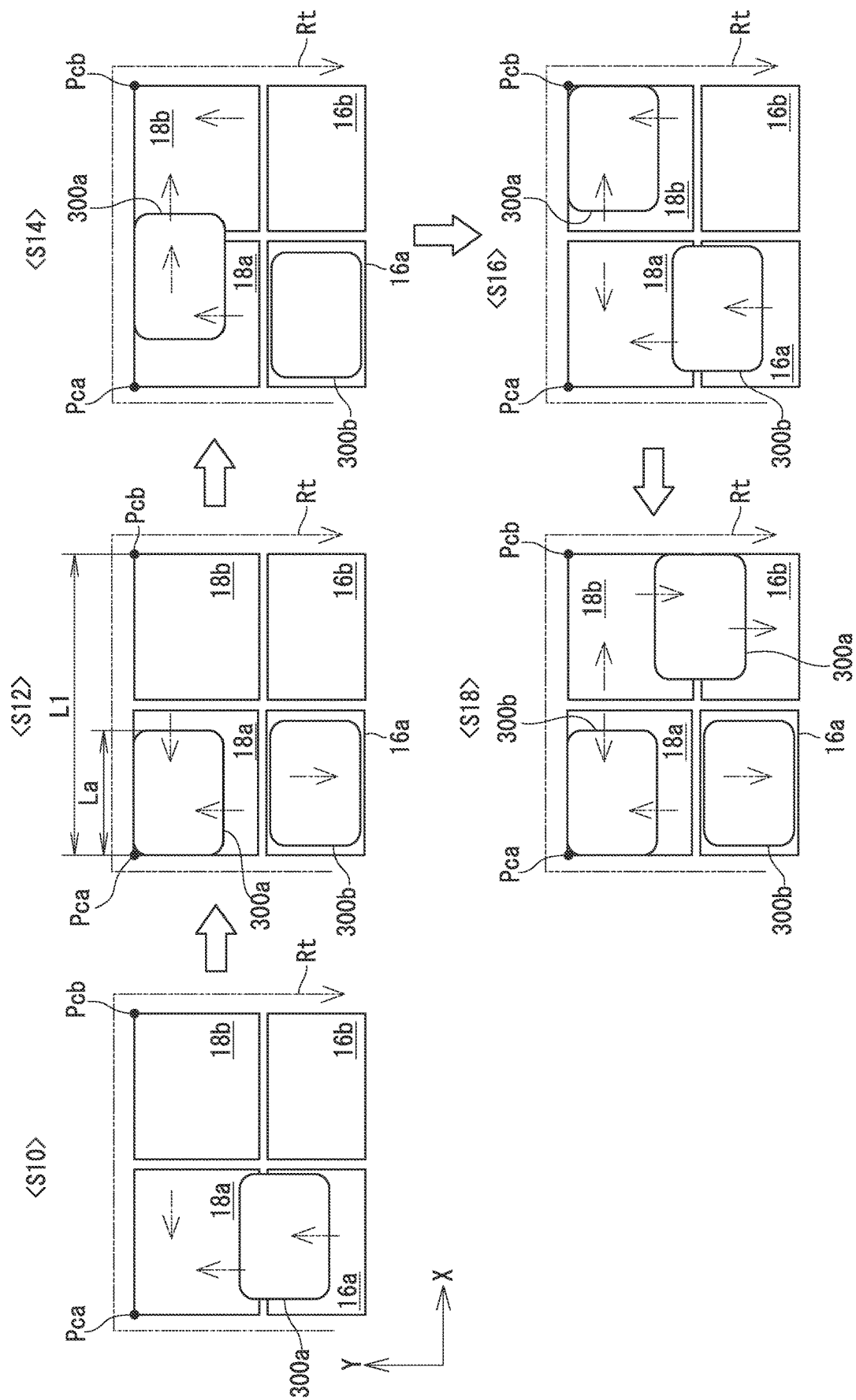
FIG. 11 is a schematic view illustrating a state of conveying the cargo by the storage conveyor.

Therefore, in this example, in order to prevent an unintended inclination of the posture of the cargo 300 and to reliably bend the cargo 300 at a right angle, in the right angle turn unit 18, the cargo 300 is pulled to the corner portion Pc, which is the downstream end in the first direction and the upstream end in the second direction of the right angle turn unit 18, and then the cargo 300 is conveyed to the downstream side in the second direction. FIG. 11 is a schematic view illustrating a state of this conveyance.

In the following description, the upper side of the paper surface of FIG. 11 is defined as the downstream side in the Y direction, and the right side of the paper surface is defined as the downstream side in the X direction. In FIG. 11, a right angle turn unit 18$a$ is disposed on the downstream side in the Y direction of a straight unit 16$a$, another right angle turn unit 18$b$ is disposed on the downstream side in the X direction of the right angle turn unit 18$a$, and another straight unit 16$b$ is disposed on the upstream side in the Y direction of the right angle turn unit 18$b$. In FIG. 11, the cargo 300$a$ is sent from the straight unit 16$a$ to the straight unit 16$b$ via the two right angle turn units 18$a$ and 18$b$. For the right angle turn unit 18$a$, the downstream side in the Y direction is the "downstream side in the first direction," and the downstream side in the X direction is the "downstream side in the second direction." For the right angle turn unit 18$b$, the downstream side in the X direction is the "downstream side in the first direction," and the upstream side in the Y direction is the "downstream side in the second direction."

As illustrated in a state S10 of FIG. 11, it is assumed that the cargo 300$a$ is sent to the downstream side in the Y direction by the straight unit 16$a$ and reaches the right angle turn unit 18$a$. In this case, the right angle turn unit 18$a$ rotates the first conveyance roller 30$f$ and the first assist roller 32$f$ forward, and rotates the second conveyance roller 30$s$ and the second assist roller 32$s$ rearward. As a result, the cargo 300$a$ is pulled toward a corner portion Pca of the right angle turn unit 18$a$, as illustrated in a state S12. Finally, two surfaces of the downstream end surface in the first direction and the upstream end surface in the second direction of the cargo 300$a$ come into contact with the two partition walls 38 (more precisely, the sliding rails 40 provided on the partition walls 38) of the right angle turn unit 18$a$. Then, even if the cargo 300$a$ is inclined due to the gradient of the road surface or the like, the posture of the cargo 300$a$ is corrected by the abutment.

When the cargo 300$a$ reaches the corner portion Pca, the right angle turn unit 18$a$ rotates all the rollers 30$f$, 32$f$, 30$s$, and 32$s$ forward, as shown in a state S14. As a result, the cargo 300$a$ is sent to the downstream side in the X direction (that is, downstream side in second direction of right angle turn unit 18$a$) while being pressed against the partition wall 38 of the downstream end in the Y direction of the right angle turn unit 18$a$ (that is, downstream end in first direction of right angle turn unit 18$a$). On the other hand, at this time, the right angle turn unit 18$b$ rotates the first conveyance roller 30$f$ and the first assist roller 32$f$ forward and rotates the second conveyance roller 30$s$ and the second assist roller 32$s$ rearward. As a result, the cargo 300$a$ is pulled toward a corner portion Pcb of the right angle turn unit 18$b$, as shown in a state S16. When the cargo 300$a$ reaches the corner portion Pcb of the right angle turn unit 18$b$, the right angle turn unit 18$b$ rotates all the rollers 30$f$, 32$f$, 30$s$, and 32$s$ forward, as shown in a state S18. Accordingly, the cargo 300 is sent out to the straight unit 16$b$.

As is apparent from the above description, in the present example, the cargo 300 is pulled toward the corner portions Pca and Pcb, which are the end portion in the first direction and the end portion in the second direction, in the right angle turn unit 18. As a result, the posture of the cargo 300 is automatically corrected, and the cargo 300 can be effectively prevented from being caught. Furthermore, in the present example, after the cargo 300 reaches the corner portions Pca and Pcb, all the rollers 30$f$, 32$f$, 30$s$, and 32$s$ are rotated forward. In other words, in the present example, the cargo 300 is delivered to the downstream side in the second direction while being pulled to the downstream side in the first direction. As a result, even in the process of movement to the downstream side in the second direction, the inclination of the cargo 300 due to the gradient of the road surface or the like can be effectively prevented.

In order to reliably correct the posture of the cargo 300$a$, it is necessary to reliably pull the cargo 300$a$ to the corner portions Pca and Pcb. In order to reliably pull the cargo 300$a$ to the corner portions Pca and Pcb, the delivery amount of the cargo 300$a$ may be monitored, or a cargo sensor 46 (refer to FIG. 8) that detects the arrival of the cargo 300$a$ at the corner portions Pca and Pcb may be provided.

For example, in the example of FIG. 11, it is assumed that a dimension in the traveling direction (that is, X direction) of the cargo 300$a$ is La, and a distance from one corner portion Pca to the next corner portion Pcb is L1. In this case, after the cargo 300a reaches one corner portion Pca, if the cargo 300a is sent out in a direction (that is, X direction) approaching the next corner portion Pcb by a distance L1−La or more, the cargo 300a should reach the next corner portion Pcb. However, the size of the cargo 300 handled by the storage conveyor 12 varies, and it is difficult to accurately grasp the dimension of the cargo 300a in the X direction. Therefore, in this example, the traveling direction dimension La of the cargo 300a is regarded as a traveling direction dimension Lmin of the smallest cargo 300 among the cargos 300 handled by the storage conveyor 12. Then, when the cargo 300a pulled to the corner portion Pca of one right angle turn unit 18a is pulled to the corner portion Pcb of the next right angle turn unit 18b, the cargo 300a is sent out in the traveling direction by a distance L1−Lmin or more. As a result, it is possible to reliably pull the cargos 300a of various sizes to the corner portion Pc.

Further, as another form, the cargo sensor 46 (refer to FIG. 8) that detects presence or absence of the cargo 300 at the corner portion Pc may be provided. The cargo sensor 46 may be, for example, a contact sensor provided in the vicinity of the corner portion Pc of each of the two sliding rails 40 of the right angle turn unit 18 and configured to output a signal by coming into contact with the cargo 300. Furthermore, as another form, the cargo sensor 46 may be a non-contact sensor configured to emit light or an electromagnetic wave toward the vicinity of the corner portion Pc and to detect presence or absence of the cargo 300 in the vicinity of the corner portion Pc according to the state of reflection or transmission of the light or the electromagnetic wave. In any case, the posture of the cargo 300 having any size can be reliably corrected by continuously performing operation of pulling the cargo 300 to the corner portion Pc until the cargo 300 is detected by the cargo sensor 46.

By the way, when a succeeding cargo 300b enters the right angle turn unit 18a at the timing of the state S14 of FIG. 11; that is, the timing when one cargo 300a is sent out to the downstream side in the second direction by the right angle turn unit 18a, the succeeding cargo 300b is also sent out to the downstream side in the second direction together with the preceding cargo 300a. In this case, since the cargo 300b is caught by the partition walls 38 of the straight units 16a and 16b, the cargo 300b cannot be appropriately conveyed.

In order to prevent such entry of the succeeding cargo 300b, in the present example, after the preceding cargo 300a starts to enter the right angle turn unit 18a and before the preceding cargo 300a is sent out to the downstream side in the second direction, the cargo 300b on the upstream side of the preceding cargo 300a is temporarily caused to travel in the reverse direction to the upstream side, as shown in the state S12. Specifically, the conveyance roller 22 of the straight unit 16a adjacent to the upstream side in the first direction of the right angle turn unit 18a is reversely rotated for a certain period of time. Similarly, the conveyance roller 22 of another straight unit 16 continuously connected to the upstream side of the straight unit 16a is reversely rotated for a certain period of time. No particular limitation is imposed on the time for reversely rotating the conveyance roller 22, but it is usually about several seconds. By this reverse rotation, an appropriate gap is formed between the preceding cargo 300a and the succeeding cargo 300b.

After the conveyance roller 22 is reversely rotated for a certain period of time, until the preceding cargo 300a is completely detached from the right angle turn unit 18a, as illustrated in the state S14 of FIG. 11, the rotation of the conveyance roller 22 of the straight unit 16a is stopped, and the succeeding cargo 300b is stopped. This prevents inappropriate entry of the succeeding cargo 300b into the right angle turn unit 18a. As a result, it is possible to prevent inappropriate transfer of the succeeding cargo 300b.

As described above, the timing of starting the reverse rotation in the straight unit 16 is not particularly limited so long as the same is after the start of the processing of pulling the preceding cargo 300a to the corner portion Pc and before the preceding cargo 300a is sent out to the downstream side in the second direction. Therefore, for example, the reverse conveyance of the succeeding cargo 300b may be started at a timing when the entire preceding cargo 300a is accommodated in the right angle turn unit 18a. The timing at which the entire preceding cargo 300a is accommodated in the right angle turn unit 18a may be determined from the delivery amount of the cargo 300a. In addition, a sensor configured to detect the position of the cargo 300a may be provided, and the timing may be detected based on a detection value of the sensor.

As is apparent from the above description, and as illustrated in FIG. 11, the cargo 300 is conveyed while being pulled to the corner portion Pc of the right angle turn unit 18. Therefore, the container (for example, a cardboard box or the like) of the cargo 300 may be rubbed against the partition wall 38 in the process of movement, and may be worn and deteriorate. However, in this example, since the sliding rail 40 covered with a low friction material is provided on the partition wall 38, such deterioration of the container of the cargo 300 can be effectively prevented.

Figure 13:
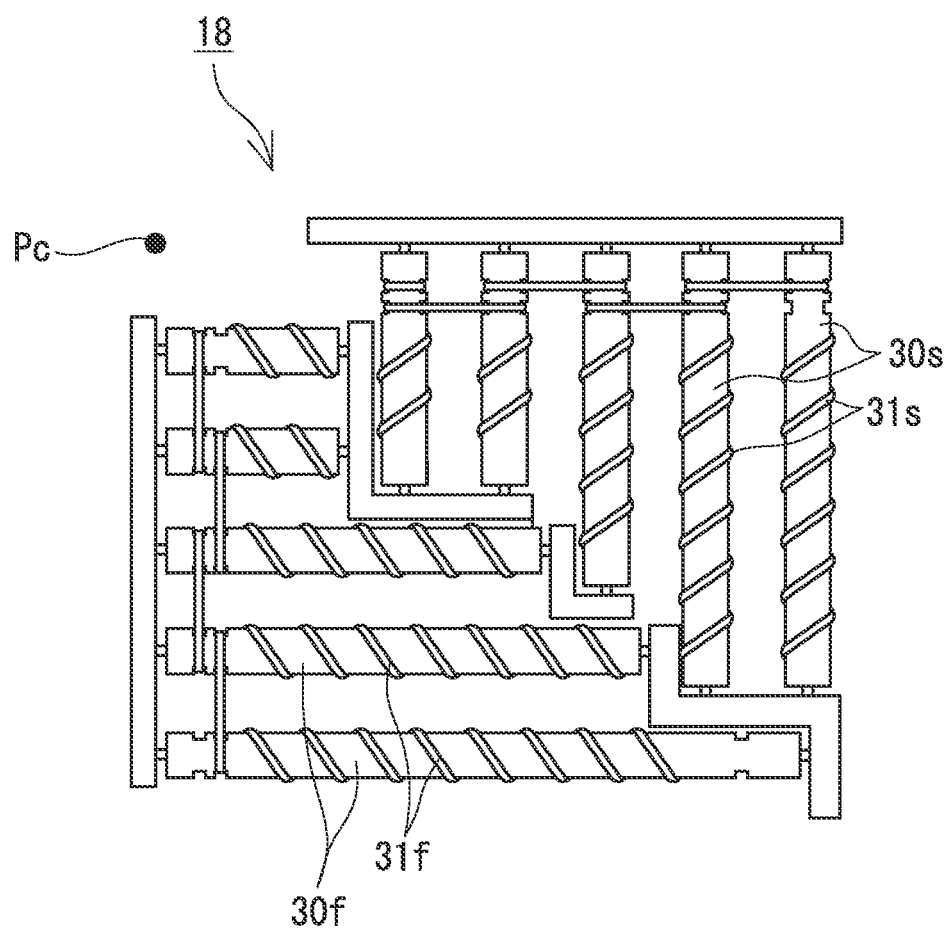
FIG. 13 is a view illustrating another example of the right angle turn unit.

The configuration of the storage conveyor 12 described so far is merely an example, and at least when the cargo 300 is bent at a right angle, other configurations may be changed so long as the cargo 300 is pulled to the corner portion Pc of the right angle turn unit 18 and then sent out to the downstream side in the second direction. Therefore, for example, the assist rollers 32f and 32s may be omitted. The first conveyance roller 30f and the second conveyance roller 30s may be rollers that send the cargo 300 in directions inclined with respect to the first direction and the second direction, respectively. For example, as illustrated in FIG. 13, spiral protrusions 31f and 31s may be provided on the peripheral surfaces of the first conveyance roller 30f and the second conveyance roller 30s respectively. In this case, the first conveyance roller 30f rotates around an axis parallel to the second direction. In addition, the protrusion 31f is inclined in a direction proceeding to the upstream in the second direction as proceeding to the downstream in the first direction in top view. The second conveyance roller 30s rotates around an axis parallel to the first direction. In addition, the protrusion 31s is inclined in a direction proceeding downstream in the first direction as proceeding downstream in the second direction in top view. With such a configuration, the cargo 300 can be pulled to the corner portion Pc by rotating the first conveyance roller 30f forward and stopping the second conveyance roller 30s, and the cargo 300 can be sent downstream in the second direction while being attracted upstream in the first direction by rotating the second conveyance roller 30s forward and stopping the first conveyance roller 30f.

REFERENCE SIGNS LIST 10 cargo handling system
12 storage conveyor
16 straight unit
18 right angle turn unit
20 lifter 22 conveyance roller
24 conveyor motor
26 belt
30f first conveyance roller
30s second conveyance roller
31f, 31s protrusion
32f first assist roller
32s second assist roller
34f first conveyor motor
34s second conveyor motor
36 belt
38 partition wall
40 sliding rail
42 lifting-and-lowering bar
44 label reader
46 cargo sensor
50 stacker
58 hand
80 fork plate
80a notch
100 relay apparatus
102 lifting-and-lowering plate
120 roof
122 roof opening
130 controller
132 processor
134 memory
150 door opening
210 drone
220 UGV
224 container
300 cargo
Af first area
As second area
Pc corner portion
Pf first transfer position
Ps second transfer position
Psd drone transfer position
Psv UGV transfer position
Rt conveyance route

The invention claimed is:

1. A storage conveyor system comprising:
a storage conveyor mounted on a vehicle and configured to convey a cargo; and
a controller configured to control driving of the storage conveyor,
wherein the storage conveyor includes a right angle turn unit configured to change a traveling direction of the cargo from a first direction to a second direction orthogonal to the first direction at a right angle, the right angle turn unit includes:
a plurality of first conveyance rollers configured to rotate around an axis parallel to the second direction and to send the cargo to a downstream side in the first direction by rotation thereof in a forward direction of the plurality of first conveyance rollers; and
a plurality of second conveyance rollers configured to rotate around an axis parallel to the first direction and to send the cargo to a downstream side in the second direction by rotation thereof in a forward direction of the plurality of second conveyance rollers, and
wherein the controller controls the driving of the storage conveyor so as to, in the right angle turn unit, pull the cargo to a corner portion, which is a downstream end in the first direction and an upstream end in the second direction of the right angle turn unit, and then convey the cargo to the downstream side in the second direction, and
the controller is configured to, when pulling the cargo to the corner portion, rotate the plurality of first conveyance rollers in the forward direction of the plurality of first conveyance rollers and rotate the plurality of second conveyance rollers in a reverse direction of the plurality of second conveyance rollers, and to, when conveying the cargo to the downstream side in the second direction, rotate the plurality of first conveyance rollers in the forward direction of the plurality of first conveyance rollers and rotate the plurality of second conveyance rollers in the forward direction of the plurality of second conveyance rollers.

2. The storage conveyor system according to claim 1, wherein
the right angle turn unit is divided into a first area in which the plurality of first conveyance rollers are disposed and a second area in which the plurality of second conveyance rollers are disposed with a diagonal line of the right angle turn unit passing through the corner portion as a boundary, and
the right angle turn unit further includes:
a first assist roller disposed in the second area and configured to rotate in a forward direction of the first assist roller so as to send the cargo to the downstream side in the first direction, the first assist roller having a diameter larger than a diameter of the plurality of second conveyance rollers; and
a second assist roller disposed in the first area and configured to rotate in a forward direction of the second assist roller so as to send the cargo to the downstream side in the second direction, the second assist roller having a diameter larger than a diameter of the plurality of first conveyance rollers.

3. The storage conveyor system according to claim 1, wherein the storage conveyor further includes:
a partition wall configured to stand along a conveyance route and to define a boundary of a conveyance path of the storage conveyor; and
a sliding rail fixed to the partition wall and configured to abut on the cargo to prevent detachment of the cargo from the conveyance route, the sliding rail having a friction coefficient lower than a friction coefficient of the partition wall.

4. The storage conveyer system according to claim 1, wherein a conveyance route of the storage conveyer system has a closed-loop shape conveying the cargo.

5. The storage conveyor system according to claim 4, wherein
the conveyance route has a forward route and a return route traveling in a direction opposite the forward route, the forward route and the return route being turned back an odd number of times in a zigzag shape so as to be alternately arranged in a direction orthogonal to the forward route, and the conveyance route extends in the direction orthogonal to the forward route so as to return to a departure point, and
two of the right angle turn units are disposed adjacent to each other in the orthogonal direction at a portion where the conveyance route is turned back.

* * * * *